Figure 5:
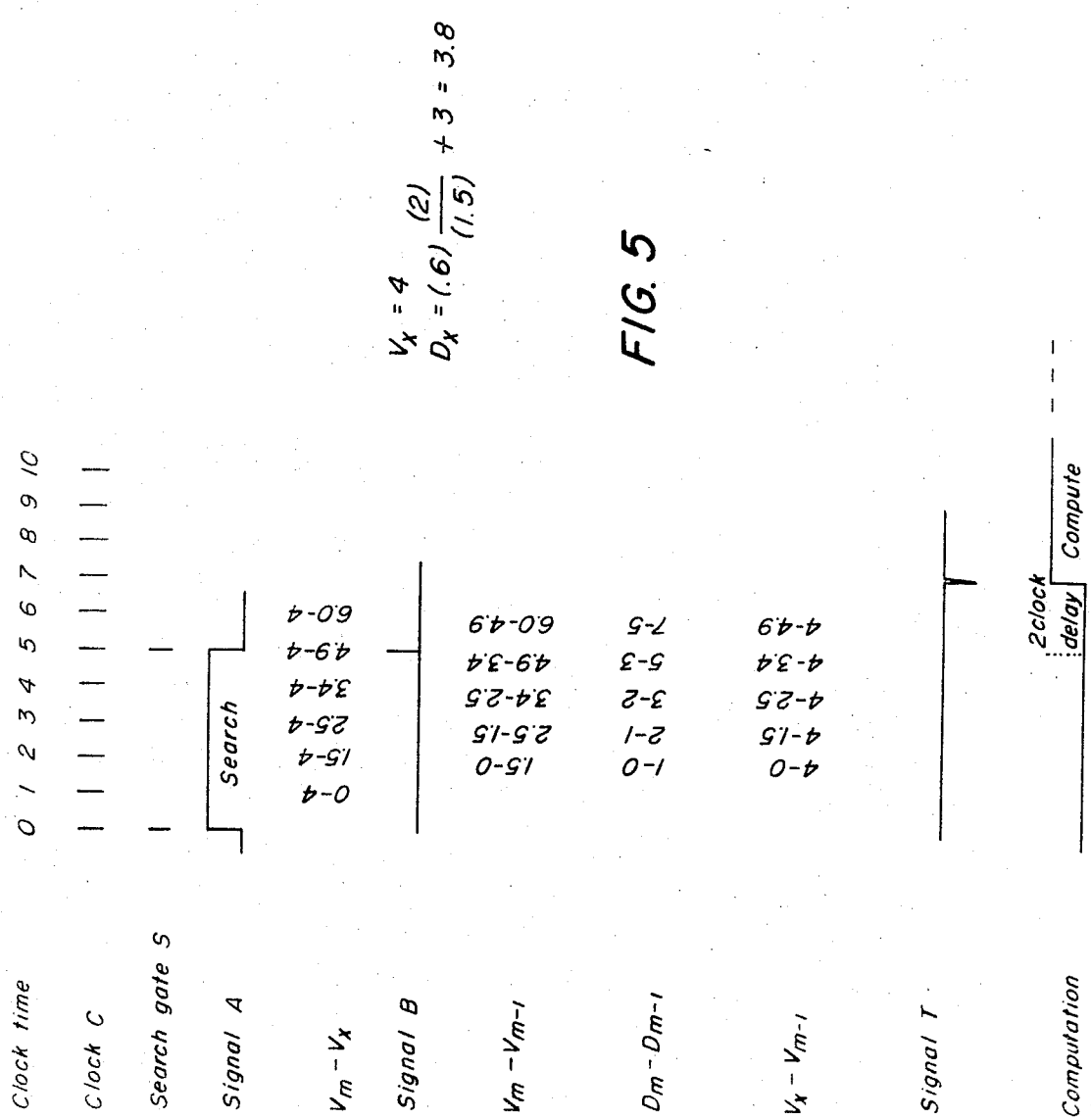

United States Patent
Rising

[15] 3,663,110
[45] May 16, 1972

[54] APPARATUS RESPONSIVE TO OPTICAL DENSITY WHEREIN AN UNKNOWN SAMPLE DENSITY IS COMPARED TO A STORED VALUE

[72] Inventor: Bradley D. Rising, Rochester, N.Y.
[73] Assignee: Eastman Kodak Company, Rochester, N.Y.
[22] Filed: Apr. 5, 1971
[21] Appl. No.: 131,324

[52] U.S. Cl............................356/203, 250/206, 250/219 F, 340/347 AD, 355/38
[51] Int. Cl........................................................G01n 21/22
[58] Field of Search...............250/206, 219 F; 356/202, 203; 340/347 AD; 355/38

[56] References Cited
UNITED STATES PATENTS
3,449,586  6/1969  Serra...............................250/219 FR Primary Examiner—Ronald L. Wibert
Assistant Examiner—Orville B. Chew, II
Attorney—W. T. French, R. F. Crocker and Robert F. Cody

[57] ABSTRACT

A set of digitized values of a density-dependent variable are stored in computer memory. A corresponding set of digitized photoelectric signals, produced from a set of reference densities, are also stored in computer memory. An unknown sample density is photoelectrically examined, the resultant signal being digitized and searched for within the computer memory, thereby to gate out of memory the digitized value of the density-dependent variable that corresponds to the digitized photoelectric signal of the sample.

6 Claims, 5 Drawing Figures

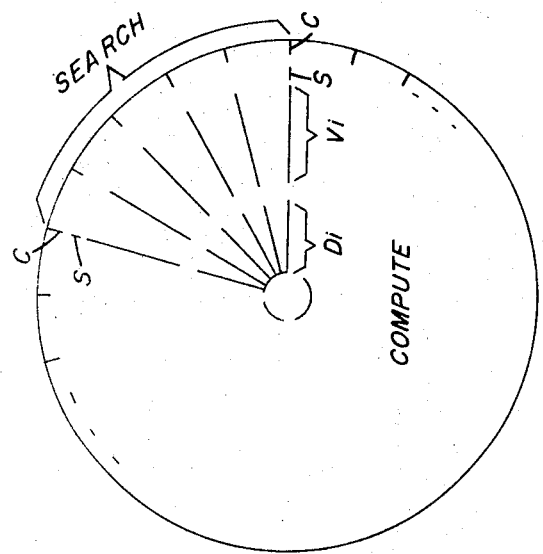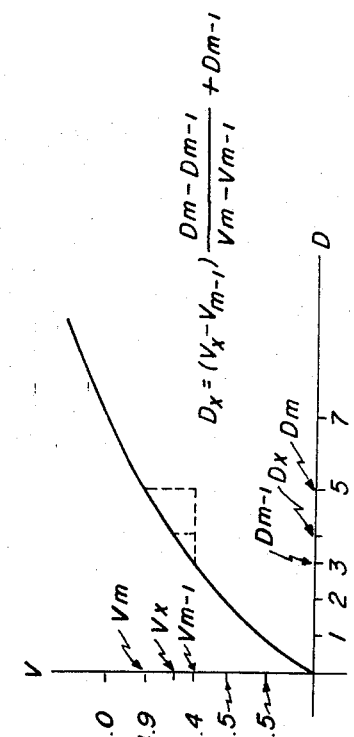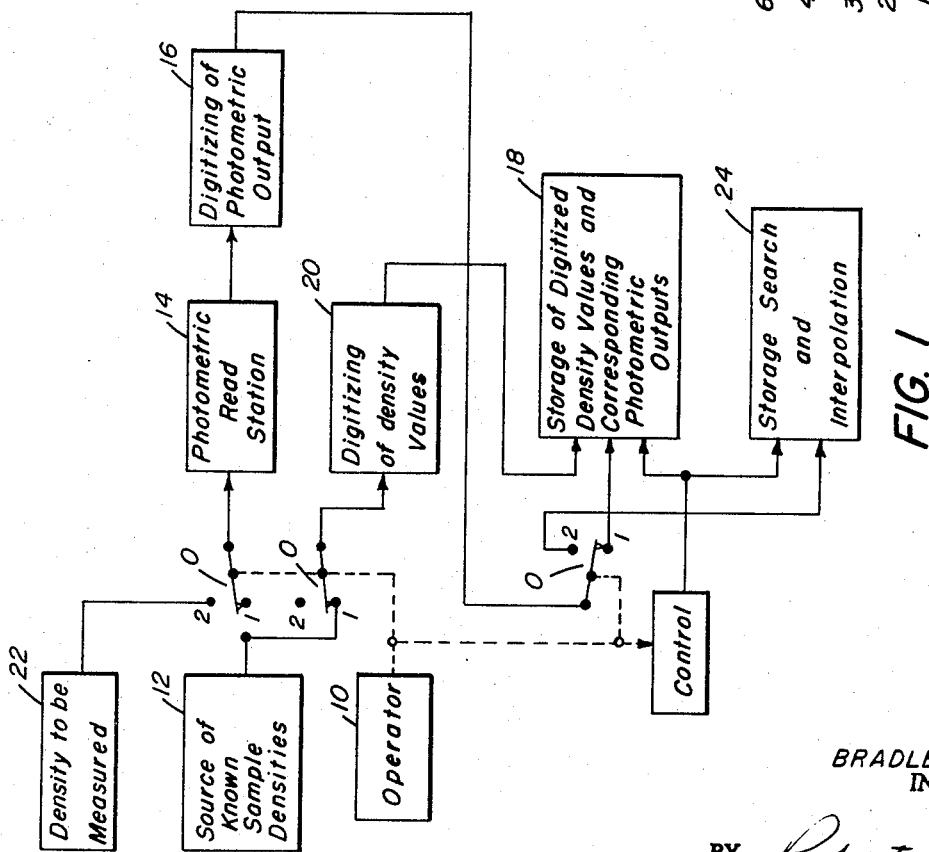

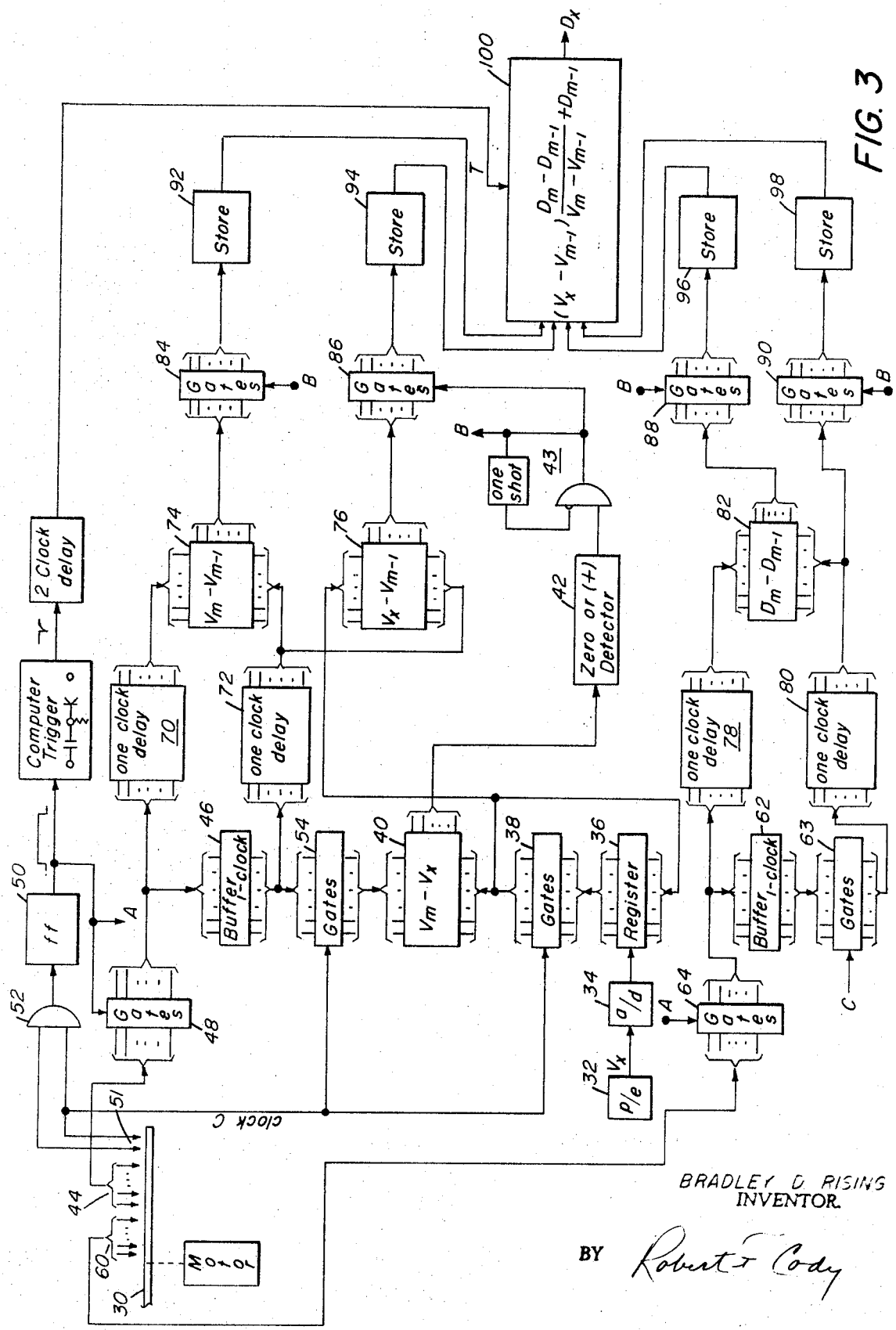

APPARATUS RESPONSIVE TO OPTICAL DENSITY WHEREIN AN UNKNOWN SAMPLE DENSITY IS COMPARED TO A STORED VALUE

BACKGROUND OF THE INVENTION

1. Field of the Invention

This invention relates in general to apparatus responsive to optical density. More particularly, the invention facilitates the control and operation of an apparatus in accordance with a photoelectric sensing of optical density.

2. Description Relative to the Prior Art

The determination of optical density, say for the purpose of causing a densitometer to register a density reading, has heretofore, usually, been performed in the analog domain. There is a present trend, however, toward the digitizing of analog signals which are representative of optical density, whereby further manipulation of density data may be conducted, say, by means of a computer. See, for example, U.S. Pats. No. 3,413,065 and 3,471,242.

In the usual density determination, whether employing analog or digital techniques, or both, a photoelectric circuit is adapted to receive light from a reference lamp that is shone through an optical sample such as a film negative. Various techniques have been devised to assure, say in densitometers, that the transfer characteristics of photoelectric circuits are linear: which is to say that their outputs vary linearly with optical density. See, for example, U.S. Pat. Application Ser. No. 801,393, now U.S. Pat. No. 3,571,599 and several of the references cited during the prosecution of such application.

When considering density determinations, say in connection with photographic printing practices, it may obtain that density-dependent exposures are to occur — not in accordance with a linear relationship between density and exposure — but rather in accordance with a non-linear relationship between density and exposure. A photographic negative to be printed on a given photographic paper, for example, may require three times as much exposure as a negative which is only twice as dense.

SUMMARY OF THE INVENTION

Given any stable photoelectric circuit, and regardless of its transfer characteristics, the concept of the invention is to produce, by means of such circuit, a first set of digitized photoelectric output signals from a set of precision reference densities, and to store, in computer memory, both the first signal set and a corresponding second set of digitized signals that relate to various values for a given density-dependent variable, e.g. density or exposure, the relationship between such two sets of signals being either linear or non-linear. As used herein, the term "density" means a sample or the like having optical density.

When a sample of unknown density is thereafter photoelectrically examined by the pickup, the digitized signal which is produced in relation to such sample is searched for within the computer memory, thereby to find the value of the density-dependent variable that corresponds to the density of the sample. Since the stored digitized signals were produced from precision reference densities, and since the photoelectric pickup is stable, the value of the density-dependent variable which is found is inherently correctly related to the sample density according to the density-to-variable relationship in question.

Applying the invention to a densitometer, for example, a set of known reference densities are photoelectrically examined to produce a first set of signals which are computer-stored in correspondence with a second set of signals which digitally equal the values of the densities from which the first signal set was produced. When an unknown density is then photoelectrically examined, the signal produced in response thereto is searched for within the computer memory to identify and produce the particular density value which corresponds to such signal. Whether the photoelectric pickup has a linear density-to-signal transfer characteristic is of no concern in the above-indicated density determination, the only requirement being that the photoelectric pickup faithfully produce the same signal output for a given density each time such density is examined.

In a presently preferred form of the invention, as will be more fully described below, the pair of stored signal sets are of some predetermined but limited extent, the computer being adapted to search and interpolate within the first signal set, thereby to identify values of the density-dependent variable (i.e. signals within the second signal set) which are not actually stored.

OBJECT(S) OF THE INVENTION

To facilitate the determination of a variable dependent on optical density; and to do so with minimal concern for the transfer characteristics of photoelectric density examining means; and/or with minimal concern for the relationship between such variable and optical density.

The invention will be described with reference to the Figures, wherein:

FIG. 1 is a block diagram, somewhat in the form of a flow diagram, which is useful for describing an embodiment of the invention, FIG. 2 indicates a particular signal-to-density relationship and is useful for explaining the invention, FIG. 3 is a schematic block diagram illustrating apparatus for practicing the invention, FIG. 4 illustrates a disc data arrangement for practicing the invention, and FIG. 5 illustrates timing details useful for an understanding of the operation of the apparatus of FIG. 3.

The invention is cast in the environment of a densitometer to facilitate its description.

For an overview of the invention, reference should be had to FIG. 1: A switch O is indicated as having two positions. Position 1 relates to a first procedural step for an operator; and Position 2 relates to a second procedural step.

STEP ONE

An operator 10 feeds a set of known optical densities 12 to a photoelectric density reading station 14, which as indicated above, must be stable but not necessarily having a particular transfer characteristic. Signals produced by the photoelectric reading station 14 are digitized 16, and applied set-wise to a computer storage device 18 in correspondence with a set of digitized 20 actual values for the densities which produced the digitized photoelectric signals.

STEP TWO

With the storage device 18 so set up, the operator 10 may now determine the value of an unknown density 22. The operator 10 feeds the unknown density 22 to the photoelectric reading station 14, the output of such station being digitized 16 and applied to a device 24, cooperative with the storage device 18, for searching within the storage device 18 for the digitized "set" signal produced from the set of known densities 12. Having found such signal, the value of the density which corresponds to such signal, i.e. the value of the unknown density 22, is read out of the device 24. As noted above, the transfer characteristics of the photoelectric reading station 14 need not be linear; and indeed the invention in its presently preferred form may work with limited sets of stored photoelectric signals and density values which non-linearly relate to each other. Thus, in FIG. 1, the device 24 may provide the additional function of interpolating between digital photoelectric signals which bracket the (stored) digital signal produced by the unknown density in question, thereby to calculate the value of such unknown density.

Reference should be had to FIG. 2 which depicts a hypothetical (non-linear) relationship between the signal outputs V of a given photoelectric device and various optical densities D effective to produce such signal outputs. In accordance with the invention in its presently preferred form, a set of, say, five stored reference densities (1,2,3,5, and 7) and five corresponding stored photoelectric signal voltages (1.5, 2.5, 3.4, 4.9, and 6.0) are used to determine, with good precision, an unknown density $D_x$.

For ease of explanation, decimal notation is used in connection with FIG. 2. Assume the unknown density $D_x$ to be indicated causes the photoelectric device 14 to produce a signal voltage $V_x = 4$ volts. In accordance with the invention in its presently preferred form, the device 24 searches to identify the stored voltages $V_m = 4.9$ volts and $V_{m-1} = 3.4$ volts which bracket the voltage $V_x = 4$ volts; and the stored density $D_{m-1} = 3$, which corresponds to the photoelectric signal voltage $V_{m-1} = 3.4$ volts: Thereafter, according to the invention, a calculation is made, based on the indicated interpolation equation, to discern the value of the unknown density $D_x$.

FIGS. 3 and 4 depict apparatus for practicing the invention: Though disposed, in FIGS. 3 and 4, in the form of an assemblage of computer components, the concepts of the invention may be implemented by means of a general purpose computer which has been programmed in accordance with the invention. Also, though only one density channel is indicated in FIGS. 3 and 4, it is to be borne in mind that when the invention is implemented, say, with three-color density inputs, various time-sharing techniques (or the like), all within the scope of those in the art, will be employed. That is, three sets of photoelectric signals and their corresponding signal densities will be stored: the apparatus of FIG. 3 handling red, green, and blue density computations in a sequential manner.

A memory disc 30 stores two sets of digitized data signals $D_i$ and $V_i$. The signals $D_i$ represent digitized values of a set of reference densities; and the signals $V_i$ represent a corresponding set of digitized signal outputs produced by means of a photoelectric device 32 used to examine such reference densities. The two sets of signals are stored in correspondence with each other on the disc 30. And the disc 30 stores, also, a set of clock pulses C around its periphery ... and in a separate track on the disc, search gate signals S are stored.

Reference should be had to the timing information to be found in FIG. 5, wherein the photoelectric signal output $V_x$ that corresponds with an unknown density $D_x$ is 4 volts; the data of FIG. 5 being indicated in decimal notation for ease of understanding.

A sample, the density $D_x$ of which is to be indicated, is examined by the photoelectric device 32 to produce the voltage $V_x$, which is digitized by an analog-to-digital converter 34, and applied to a register 36. In response to clock pulses C, gates 38 periodically apply the digitized photoelectric signal $V_x$ as a subtrahend to a subtraction device 40. The subtraction device 40 sequentially receives, as minuends, the stored digitized photoelectric voltages $V_i$ and, when its two inputs are either equal, or when its minuend signal is greater than its subtrahend signal, the subtraction device 40 causes a detector 42 to produce a gate output signal B. The detector may take any of a variety of forms within the scope of those in the art. The data signals $V_i$ which are applied to the subtraction device 40 are read out of the disc 30 by means of read heads 44, and applied to a buffer register 46 by means of gates 48. The gates 48 are cyclically opened for durations defined by square wave signals (signal A) produced by a flip-flop 50 which turns on and off in response to pulse signals C and S which are read by heads 51 and applied to an AND circuit 52.

Data which is stored in the buffer register 46 is gated (gates 54) into the subtraction device 40 one clock pulse after such data is read by the heads 44.

The stored density signals $D_i$ are sequentially read by read heads 60 and applied to a buffer register 62 via gates 64 which are opened by the flip-flop output signal A. Data is gated (gates 63) out of the buffer register 62 one clock pulse after such data is applied to such register.

Delay devices 70,72 serve to present simultaneously the signals $V_m$ and $V_{m-1}$ to a subtraction device 74; and the delay device 72 additionally serves to present the signals $V_{m-1}$ to a subtraction device 76 at the same time that the signal $V_x$ is applied to such subtraction device.

Delay devices 78,80 serve to present simultaneously the signals $D_m$ and $D_{m-1}$ to a subtraction device 82.

At the moment that the signal $V_x$ equals or is greater than the signal $V_{m-1}$, i.e. when the detector 42 produces an output pulse B (at clock time 5 in FIG. 5), gates 84,86,88,90 respectively apply the signals $V_m - V_{m-1}$, $V_x - V_{m-1}$, $D_m - D_{m-1}$, and $D_{m-1}$ to storage devices 92,94,96,98. (Since several coincidence situations may occur within the subtraction device 40, during a rotation of the disc 30, a logic circuit 43 is disposed to permit only the first of any detector 42 output from being applied to the gates 84,86,88,90 during such disc rotation.) And, one clock pulse after the last possible occurrence of a signal B, i.e. one clock after clock time 6, an interpolation computation is performed by a computer 100 in response to a trigger pulse T, which is initiated by the flip-flop 50, thereby to identify the density $D_x$ of the sample.

The invention has been described in detail with particular reference to preferred embodiments thereof, but it will be understood that variations and modifications can be effected within the spirit and scope of the invention. As noted above, the invention has been cast in the environment of a densitometer. It will be appreciated, however, that the signals $D_i$ which are stored may represent various density-dependent exposure times (etc.) to be effected within a photographic printer.

What is claimed is:

1. Apparatus responsive to optical density comprising:
   a. photoelectric means for examining optical densities and for producing signals proportional to said densities,
   b. means for digitizing said signals,
   c. means for storing a first set of signals representing digitized values of a density-dependent variable and a corresponding second set of digitized signals produced in response to the examination of a set of standard densities by said photoelectric means,
   d. means cooperative with said signal digitizing means for searching and identifying within said storing means the stored signal of said second set which is most nearly the equivalent of the output of said signal digitizing means, and
   e. means cooperative with said searching means for gating out of said storing means the digitized signal of said first set that is representative of the particular value of said density-dependent variable that most nearly corresponds with said identified second set signal.

2. The apparatus of claim 1 wherein the signals of said first set of signals represent values of optical density.

3. The apparatus of claim 1 wherein the signals of said first set of signals represent density-dependent times for making photographic exposures.

4. The apparatus of claim 1 wherein said apparatus includes:
   a. means, cooperative with said means for searching, for identifying the pair of stored second set of signals which are respectively just greater and just less than the signal output of said digitizing means,
   b. means cooperative with said gating means for gating out of said storing means at least one first set signal corresponding to one signal in said pair of first set signals, and
   c. computing means, adapted to receive said pair of second set signals and said first set signal, for interpolating between said second set signals to produce a signal representing the particular value of said density-dependent variable that corresponds with the signal output of said digitizing means.

5. The apparatus of claim 4 wherein the signals of said first set of signals represent values of optical density.

6. The apparatus of claim 4 wherein the signals of said first set of signals represent density-dependent times for making photographic exposures.

* * * * *